(12) United States Patent
Hanaoka et al.

(10) Patent No.: US 8,776,390 B2
(45) Date of Patent: Jul. 15, 2014

(54) DRYING APPARATUS UNDER REDUCED PRESSURE FOR PLASTIC MOLDING MATERIAL

(75) Inventors: Kazunari Hanaoka, Hirataka (JP); Junji Nakagawa, Hirakata (JP)

(73) Assignee: Kabushiki Kaisha Matsui Seisakusho, Osaka (JP)

( * ) Notice: Subject to any disclaimer, the term of this patent is extended or adjusted under 35 U.S.C. 154(b) by 329 days.

(21) Appl. No.: 13/264,723

(22) PCT Filed: Apr. 20, 2010

(86) PCT No.: PCT/JP2010/057023
§ 371 (c)(1),
(2), (4) Date: Oct. 14, 2011

(87) PCT Pub. No.: WO2010/123010
PCT Pub. Date: Oct. 28, 2010

(65) Prior Publication Data
US 2012/0030961 A1  Feb. 9, 2012

(30) Foreign Application Priority Data
Apr. 21, 2009  (JP) .................................. 2009-102786

(51) Int. Cl.
*F26B 17/12*  (2006.01)

(52) U.S. Cl.
USPC ................ 34/168; 34/173; 34/201; 428/34.4; 96/126

(58) Field of Classification Search
USPC ............ 34/165, 168, 201, 210, 218; 700/282; 206/524.6; 428/34.4, 402, 497; 96/112, 96/126; 95/14, 17
See application file for complete search history.

(56) References Cited

U.S. PATENT DOCUMENTS

| | | | | |
|---|---|---|---|---|
| 3,161,483 A | * | 12/1964 | Morris | 34/580 |
| 3,455,031 A | * | 7/1969 | Van Gelder | 34/289 |
| 3,521,371 A | * | 7/1970 | Kraft | 34/412 |
| 3,681,851 A | * | 8/1972 | Fleming | 34/291 |
| 4,170,074 A | * | 10/1979 | Heckman et al. | 34/586 |
| 4,753,016 A | * | 6/1988 | Eichholz | 34/86 |
| 5,020,237 A | * | 6/1991 | Gross et al. | 34/265 |
| 5,033,208 A | * | 7/1991 | Ohno et al. | 34/168 |
| 5,341,576 A | * | 8/1994 | Tsutomu et al. | 34/263 |
| 5,361,514 A | * | 11/1994 | Lahoda et al. | 34/391 |
| 6,163,976 A | * | 12/2000 | Tada et al. | 34/72 |

(Continued)

FOREIGN PATENT DOCUMENTS

| | | | |
|---|---|---|---|
| CN | 1253066 A | | 5/2000 |
| CN | 1705856 A | | 12/2005 |
| CN | 1729377 A | | 2/2006 |
| JP | 62184034 A | * 8/1987 | .............. C08J 11/10 |

(Continued)

*Primary Examiner* — Steve M Gravini
(74) *Attorney, Agent, or Firm* — DLA Piper LLP (US)

(57) ABSTRACT

A drying apparatus under reduced pressure for a plastic molding material. The apparatus comprises a drying hopper provided with an airtight material charge valve capable of containing gas therein at its upper portion and a material discharge valve at its lower portion, and connected to a vacuum pump via vacuum piping, a heating means of thermal conduction type provided in the drying hopper, and a plastic material adherence preventing means in which a gas charge port connected to a gas tank storing gas via a gas changeover valve is provided between the material discharge valve and the drying hopper and stored gas is fed into the drying hopper by opening the gas changeover valve after predetermined time, thereby preventing adherence of plastic molding material.

3 Claims, 3 Drawing Sheets

(56) References Cited

U.S. PATENT DOCUMENTS

| | | | |
|---|---|---|---|
| 6,748,671 B1* | 6/2004 | Vrbanac et al. | 34/427 |
| 2002/0112367 A1* | 8/2002 | Becker et al. | 34/359 |
| 2005/0022415 A1* | 2/2005 | Yancey et al. | 34/221 |
| 2006/0185186 A1* | 8/2006 | Maguire | 34/92 |
| 2009/0113749 A1* | 5/2009 | Schellstede | 34/247 |
| 2010/0011610 A1* | 1/2010 | Bittorf et al. | 34/359 |
| 2012/0030961 A1* | 2/2012 | Hanaoka et al. | 34/165 |
| 2013/0055583 A1* | 3/2013 | Hackl et al. | 34/380 |
| 2013/0212904 A1* | 8/2013 | Adachi | 34/573 |

FOREIGN PATENT DOCUMENTS

| | | |
|---|---|---|
| JP | H07-101150 B | 11/1995 |
| JP | 2000-127153 A | 5/2000 |
| JP | 2000-167830 A | 6/2000 |
| JP | 2000-176271 A | 6/2000 |
| JP | 2001-150436 A | 6/2001 |
| JP | 3222874 | 10/2001 |
| JP | 2004-198066 A | 7/2004 |
| JP | 2006-062308 A | 3/2006 |
| WO | WO 2004/061383 A1 | 7/2004 |
| WO | WO 2010123010 A1 * | 10/2010 |

* cited by examiner

DRYING APPARATUS UNDER REDUCED PRESSURE FOR PLASTIC MOLDING MATERIAL

TECHNICAL FIELD

The present invention relates to a drying apparatus under reduced pressure having an adherence preventing means for a plastic molding material.

BACKGROUND ART

In case of drying a plastic molding material such as pellets or pulverized materials before molding, a method using a ventilation type dryer has been conventionally adopted. The ventilation type drying is such a method that a charge port for a plastic molding material is provided on the dryer and a discharge port is provided under the dryer, heated air heated to predetermined temperature is introduced under the dryer to ventilate upwardly, and a plastic molding material is heated and dried. However, such a ventilation type drying method which discharges heated air introduced in the dryer to factories is not good for environment, therefore, recently there has been a method of drying a plastic molding material by heat transmission and of evacuating generated moisture out of the system by further vacuumizing and such a method is used as a method which does not release heated air introduced in the dryer therefrom. Patent Literature 1 (JP2000-127153-A) discloses a method for promoting drying in which a little amount of purge air is injected in order to discharge moisture generated in a drying hopper from a dryer, and the amount of purge air is designed so as to be able to promote drying while keeping vacuum state in case of vacuum drying.

However, according to such a method of heating a plastic molding material by heat transfer, it is important to heat a plastic molding material by heat transfer as much as possible and to uniformly heat the material. For this purpose, a heat transfer fin is provided and contacting area of a heat transfer fin and a plastic molding material is required to be wide in order to increase area for receiving heat transfer.

When a plastic molding material stands still for a long time while being surrounded with the heat transfer fins in dried state, the surface of the plastic molding material is activated or gas is volatized from the surface of the plastic molding material. As a result, there have been such problems that the plastic molding material comes to adhere to the heat transfer fin and the plastic molding materials come to adhere each other, thereby being unable to be discharged from the lower end, namely the plastic molding material cannot be discharged from the drying hopper, and the plastic molding material cannot be stably discharged.

As a suggestion for improvement, disclosed in Patent Literature 2 (JP-H07-101150-B), a vibrating device, a striking device, or the like is provided outside a dryer and a plastic molding material in the dryer is shaken by vibration and so on from the outside of the dryer and so on. However, vibration and impact on a machine apply burdens the machine and crack it, and makes unable to execute first-in first-out discharge of a plastic molding material, thereby such a method is inappropriate for continuous processing. In addition, in case of vacuum drying, application of vibration and impact causes leak and sufficient effects cannot be obtained.

In another method as disclosed in Patent Literature 3 (PCT publication WO2004/061383), there has been a method in which material is forcibly pulled and the material in the drying hopper is moved when material is not discharged from a dryer after predetermined time, thereby preventing discharging failure caused by adherence. However, in such a method, drying time for a plastic molding material in the drying hopper cannot be controlled in a circulation line for returning the discharged plastic molding material to the dryer, and failure is caused by over-dried materials and energy is wasted.

CITATION LIST

Patent Literature

PTL 1: JP2000-127153-A
PTL 2: JP H07-101150-B
PTL 3: PCT publication WO2004/061383

SUMMARY OF INVENTION

Technical Problem

The object of the present invention is to provide a drying apparatus under reduced pressure having an adherence preventing device for a plastic molding material which prevents adherence of a plastic molding material when a powdered or granular material is dried in a drying hopper in depressurized state, and which can stably supply a dried material while providing an adherence preventing measure for a plastic molding material and preventing short-pass phenomenon of a plastic molding material.

Solution to Problem

The drying apparatus under reduced pressure of the present invention in order to achieve the above-mentioned object is characterized in that it comprises a drying hopper provided with an airtight material charge valve capable of containing gas therein at its upper portion and a material discharge valve at its lower portion, and connected to a vacuum pump via vacuum piping, a heating means of thermal conduction type provided in the drying hopper, and a plastic material adherence preventing means in which a gas charge port connected to a gas tank storing gas via a gas changeover valve is provided between the material discharge valve and the drying hopper and stored gas is charged into the drying hopper by opening the gas changeover valve after predetermined time, thereby preventing adherence of plastic molding material.

Further according to the present invention, a gas changeover valve with three connection ports can be provided for the gas tank as the gas changeover valve, in which a first connection port is always connected to the gas tank, a second connection port is connected to a gas pressure regulation valve connected to a gas supply port via an on-off valve, and a third connection port is connected to the gas charge port via an on-off valve. At its normal operation the on-off valve of the gas supply port can be opened and the on-off valve of the gas charge port can be closed, while after predetermined time of the normal operation, stored gas is charged into the drying hopper by closing the on-off valve of the gas pressure regulation valve and opening the on-off valve of the gas charge port while keeping the drying hopper depressurized.

In the present invention, the adherence preventing means can be designed to have a gas tank for storing gas from a compressed air source, an on-off valve provided for a pipe connecting the gas tank to the drying hopper, and a gas charge port for introducing gas passed through the pipe to the lower end in the drying hopper, wherein the on-off valve is opened by controlling a CPU and the like as a control part, gas in the gas tank is instantaneously introduced to the drying hopper from the gas charge port to rapidly raise the pressure in the drying hopper, thereby preventing adherence of a plastic molding material. In addition, in the present invention, the vacuum pump can be controlled to be stopped when gas stored in the gas tank is charged into the drying hopper.

Advantageous Effects of Invention

In the drying apparatus under reduced pressure of the present invention, gas stored in the gas tank is instantaneously charged in the drying hopper in depressed state from the gas charge port, so that a plastic molding material stored in the drying hopper can be moved so as to be entirely lifted up by resistance against instantaneous flow of gas, thereby achieving an effect of preventing short-pass phenomenon of material and adherence of plastic molding materials each other.

In the drying apparatus under reduced pressure for a plastic molding material of the present invention, the gas tank can be designed to have the gas changeover valve with three connection ports, a first one can be always connected to the gas tank, a second one can be connected to the gas pressure regulation valve connected to the gas supply port via an on-off valve, and a third one can be connected to the gas charge port via an on-off valve. In normal drying conditions, gas which is controlled to have predetermined volume by opening the on-off valve of the gas pressure regulation valve and closing the on-off valve of the gas charge port is stored in the gas tank. After predetermined time, gas which is stored under pressure at predetermined volume by closing the on-off valve of the gas pressure regulation valve and opening the on-off valve of the gas charge port is charged to the drying hopper, thereby preventing adherence of plastic molding materials each other while keeping in depressurized state in the drying hopper.

In addition, if control is executed such that the vacuum pump is stopped when gas stored in the gas tank is charged in the drying hopper, the gas stored in the gas tank can be charged to the drying hopper rapidly and effectively.

DESCRIPTION OF EMBODIMENTS

Figure 1:
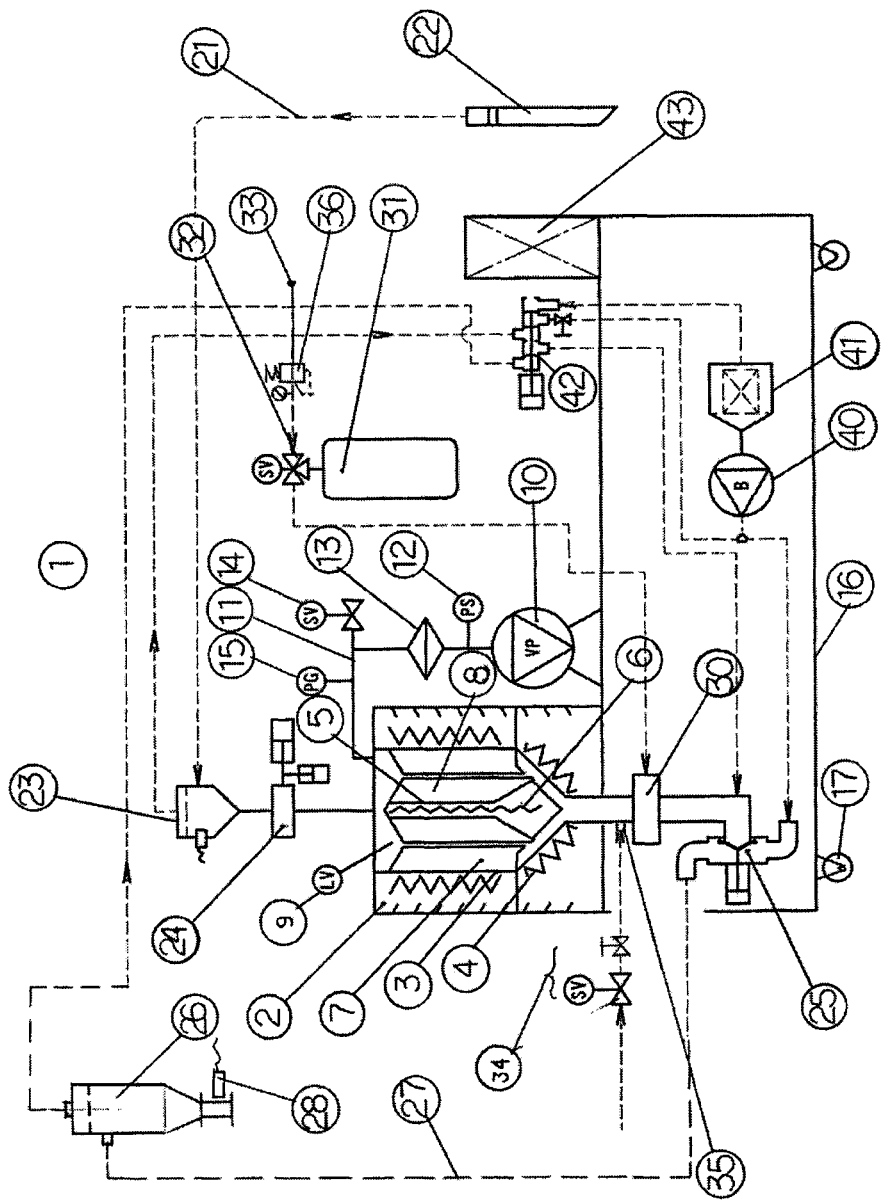
FIG. 1 is a system diagram showing the entire structure of one embodiment of a drying apparatus under reduced pressure having an adherence preventing means for resin according to the present invention.
Figure 2:
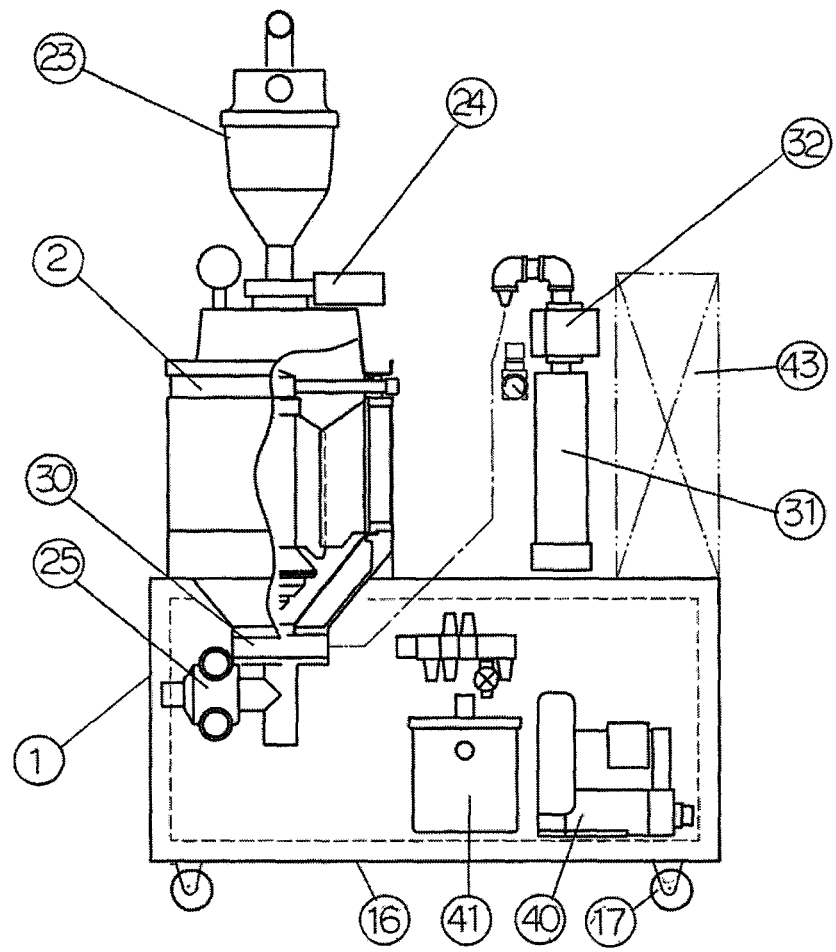
FIG. 2 shows an external view, a part of which is cut out, of a main body of a drying apparatus under reduced pressure having an adherence preventing means for resin according to one embodiment of the present invention.
Figure 3:
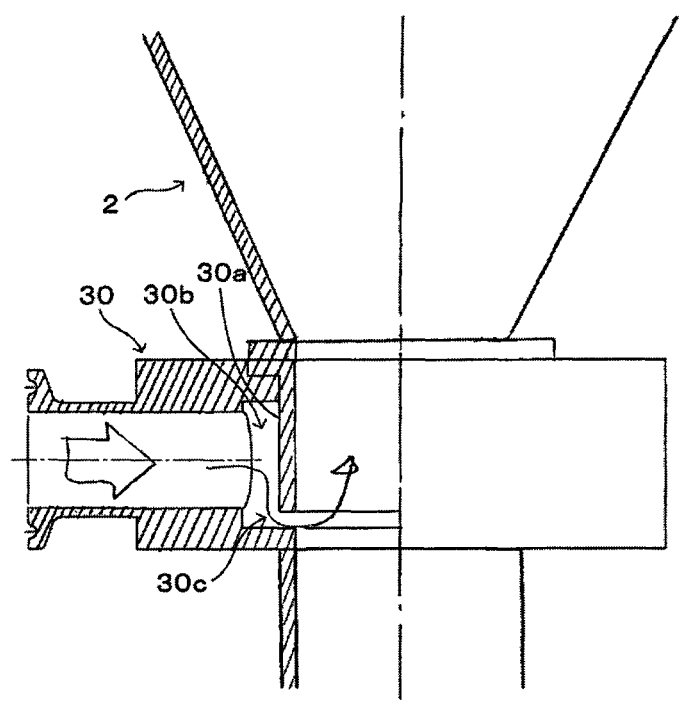
FIG. 3 is a detailed view of one embodiment of a gas charge port of the drying apparatus under reduced pressure according to the embodiment of the present invention.

One embodiment of a drying apparatus under reduced pressure for a powdered or granular material according to the present invention is explained referring to the drawings. FIG. 1 is one embodiment of a drying apparatus under reduced pressure for a plastic molding material having an adherence preventing means according to the present invention and shows a system diagram of the entire structure when it is used for plastic molding. FIG. 2 shows an external view of a main body of the drying apparatus under reduced pressure according to the embodiment of the present invention and is a front view a part of which is cut out. FIG. 3 is a detailed view of a gas charge port.

A drying apparatus under reduced pressure 1 shown in FIG. 1 is a floor model, in which a thermal conduction wall 3 made of material with high thermo-conductivity such as aluminum and the like is provided at the outer circumferential portion in a drying hopper 2 and an outer-side heating means 4 constituted with a band heater is provided at the outer circumference of the thermal conduction wall 3. A thermal conduction tube 5 made of material with high thermo-conductivity such as aluminum and the like is provided in the drying hopper 2, and an inner-side heating means 6 constituted with a pipe heater is included in the center of the tube. A plurality of thermal conduction fins 7 which are provided vertically and have substantially same width are extended from the thermal conduction wall 3 radially into the center at substantially same space. A plurality of inner-side thermal conduction fins 8 with substantially same width are extended from the thermal conduction tube 5 outwardly and radially at substantially same space. An appropriate space can be formed between the tip end of the thermal conduction fin 7 and the corresponding tip end of the inner-side thermal conduction fin 8 so as not to stop a plastic molding material or they can abut each other. In case of resin material, pellets are often used as a plastic molding material.

A level gauge (LV) 9 for detecting the amount of a powdered or granular material in the drying hopper 2 is provided therein. Vacuum piping 11 connected from a vacuum pump 10 to the drying hopper is connected with a vacuum sensor (PS) 12 for detecting predetermined degree of vacuum, a filter 13 for suction gas, a vacuum break valve 14 for returning the drying hopper 2 into atmospheric pressure, and a pressure gauge (PG) 15 for measuring the degree of vacuum or the degree of depressurization in the drying hopper 2.

The drying hopper 2 is placed on a pedestal 16 under which casters 17 are provided so as to be movable. A material charge valve 24 is provided on the drying hopper 2, and a collector 23 connected to a nozzle 22 provided for a material tank and the like via primary-side material transport piping 21 is provided on the material charge valve 24. A material discharge valve 25 is provided under the drying hopper 2 and is connected to a collection hopper 26 on a molding machine constituting a secondary-side transporting destination via secondary-side material piping 27.

A gas charge port 30 and an introduction port 35 connected to a carrier gas introduction valve 34 are provided between the lower part of the drying hopper 2 and the material discharge valve 25. FIG. 3 shows details of the gas charge port 30. Gas is horizontally introduced from a gas tank 31 to the lower part of the drying hopper as shown with the arrow in the figure. A straight pipe 30a having substantially the same diameter with that of the lower end of the drying hopper is provided, a space 30b is provided between the circumference of the straight pipe 30a and the inner circumference of a connection tube of the gas charge port 30, and a gap 30c is provided under the straight pipe, in order to prevent pressure loss caused by being covered with resin when gas is charged, thereby being able to introduce gas while reducing the pressure loss.

The gas tank 31 which stores gas as a prevention means for preventing adherence of resin is connected with one connection port of the gas changeover valve 32 comprising two on-off valves and the connection port. One of the on-off valves is connected to the gas pressure regulation valve 36 and the other on-off valve is connected to the gas charge port 30 so as to switch the gas tank 31 into the gas pressure regulation valve 36 and the gas charge port 30. The pressure regulation valve 36 is provided between a gas supply port 33 and the gas changeover valve 32. Namely in this embodiment, the adherence preventing device as an adherence preventing means comprises the gas tank 31 for storing gas supplied from the gas supply port 33 connected to a compressed air source and so on, the gas changeover valve 32 as an on-off valve provided for piping communicating the gas tank 31 and the drying hopper 2, and the gas charge port 30 for introducing the gas passed through the piping to the lower end in the drying hopper 2. CPU and the like as the control part control such that the gas changeover valve is switched to be opened, the gas in the gas tank 31 is instantaneously introduced to the drying hopper 2 from the gas charge port 30 to rapidly increase the pressure in the drying hopper 2, to be mentioned later.

In addition, the carrier gas introduction valve 34 is connected to an air supply port, however, it can be connected to dehumidified gas supply port.

A material transport blower 40 is provided on the pedestal 16, a transport filter 41 for filtering transport air is connected to a suction side, and the transport filter 41 is selectively connected to pass transport discharge from the collection hopper 26 on the resin molding machine or transport discharge from the collector 23 via a transport air changeover valve 42. The vacuum pump (VP) 10 for vacuumizing the drying hopper and a control panel 43 having a control part such as a CPU for controlling the entire drying apparatus under reduced pressure 1 are also provided on the pedestal 16. The following operations are executed based on predetermined programs by the control part of the control panel 43.

Next, operations are explained. Small compartments are produced by the thermal conduction wall 3, the thermal conduction tube 5, the thermal conduction fins 7, the inner-side thermal conduction fins 8 in the drying hopper 2, the sectional area of thereof are almost the same, and the transmitted heat from the thermal conduction wall 3 and the like is designed to be uniformly transmitted to a powdered or granular material in the small compartments. Many thermal conduction fins 7 and inner-side thermal conduction fins 8 are provided and the surface area for heat transmission is made large so as to improve efficiency of heat transmission.

In the drying apparatus under reduced pressure 1, the vacuum pump (PV) 10 constitutes a depressurization means for generating moisture and miscellaneous gas like volatile gas from a plastic molding material and also works as a gas release means for introducing gaseous body including the miscellaneous gas in the drying hopper to outside. The introduction port 35 connected to the carrier gas introduction valve 34 constituted with a regulation valve for adjusting the introduction amount of carrier gas for carrier gas replacement is provided under the drying hopper 2.

In the drying apparatus under reduced pressure 1 for a plastic molding material using the carrier gas displacement, the transport air changeover valve 42 is switched to open the discharge side of the material transport blower 40, on the other hand the changeover valve 42 is switched to the collector 23 side, the suction side of the transport blower 40 is connected to the collector 23 and a plastic molding material is collected in the collector 23 via the nozzle 22. Then, a powdered or granular material is charged in the drying hopper 2 from the collector 23 and is stored in the drying hopper 2 until the level gauge 9 generates signals. Then the drying hopper 2 is kept airtight, the stored powdered or granular material is heated by the outer-side heating means 4 and the inner-side heating means 6, in addition the drying hopper 2 is depressurized to predetermined pressure degree by the vacuum pump 10, thereby depressurizing the plastic molding material.

Thus, moisture contained in the plastic molding material is generated as moisture, and volatile component contained in the material is generated as volatile gas. While generating such gas, carrier gas of which moisture content and temperature are regulated is introduced from the introduction port 35 to the drying apparatus under reduced pressure 1, gaseous body including miscellaneous gas in the drying hopper 2 is simultaneously aspirated by the vacuum pump 10 and is introduced out of the drying hopper 2, thereby depressurizing and drying the plastic molding material.

When pellets of plastic molding material at a secondary transport destination are consumed and transport request signals at secondary-side are generated by a material level gauge 28 provided for the collection hopper 26 on the molding machine, the transport air changeover valve 42 is connected to the collection hopper 26 on the molding machine, then the material discharge valve 25 is opened, and the material transport blower 40 is driven, thereby dried pellets as a plastic molding material are pneumatically transported from the drying hopper 2. Accordingly, the material in the drying hopper 2 moves downward.

If such operations are regularly executed within a predetermined period, pellets being a plastic molding material do not cure. However, different from normal ventilation drying, in case of the drying apparatus under reduced pressure 1 in which an air layer on the boundary surface of the plastic molding material by dried air is not produced on the surface of the plastic molding material, volatile gas generated from the plastic molding material adheres on the boundary surface to harden the plastic molding material. Such hardening can be broken by a little vibration in its early stage, however, when the material becomes dry while staying still for a long time, it is difficult to break hardened material. Therefore, period in which hardened plastic molding material as material to be dried can be destroyed with a little vibration is set in advance. When a secondary transportation does not occur within the set time, the adherence preventing device for a plastic molding material is operated as the adherence preventing means for a plastic molding material.

At first the gas changeover valve 32 opens the on-off valve provided between the gas tank 31 and the gas pressure regulation valve 36 to fill gas in the gas tank 31 till the pressure set by the gas pressure regulation valve 36.

Next, after fixed time, the gas changeover valve 32 is switched to open the on-off valve provided between the gas tank 31 and the gas charge port 30, fixed amount of gas is instantaneously charged from the gas tank 31 in the drying hopper 2, and the material in the drying hopper 2 is entirely moved by the impact, thereby preventing adherence of material. After gas is charged in the drying hopper 2, the gas changeover valve 32 is switched to communicate the gas tank 31 and the gas pressure regulation valve 36, and for example, gas is charged in a 2-litter gas tank 31 to become set pressure of 0.2 MPa, for example. In one embodiment, when the gas changeover valve 32 is switched and pressurized gas is charged for 1 second or less, the upper part of the powdered or granular material in the drying hopper 2 is moved up at 10 mm, the degree of vacuum becomes −0.9 kPa to −0.6 kPa, which shows depressurized state is maintained although the pressure becomes close to atmospheric pressure, then the pressure is returned to its original vacuum pressure of −0.9 kPa within about 30 seconds.

Such operations can be started as operations of an adherence preventing means for a plastic molding material, when the gas supply pressure to the gas tank 31 reaches a set value and the pressure in the drying hopper 2 reaches normal degree of vacuum regardless of timing of secondary transportation.

As a modified embodiment, the gas changeover valve 32 can be always connected to the gas tank 31 using a three-direction changeover valve, and one connecting destination can be switched to the gas pressure regulation valve 36 or the gas charge port 30.

The adherence preventing means for a plastic molding material in which gas stored in the gas tank 31 is charged in the drying hopper 2 by opening the gas changeover valve and adherence of material is prevented is not limited to the above-mentioned embodiment. For example, it can be provided with the gas tank 31 storing gas supplied from the gas supply port 33 connected to a compressed air source such as a compressor or a high-pressure gas tank, an on-off valve as a gas changeover valve provided for a piping communicating the gas tank 31 and the drying hopper 2, and the gas charge port 30 for introducing the gas passed through the piping to the lower end in the drying hopper 2, wherein the on-off valve is opened by the control part such as CPU, the gas in the gas tank 31 is instantaneously introduced in the drying hopper 2 from the gas charge port 30 to rapidly increase the pressure in the drying hopper 2, and adherence of plastic molding material is prevented. Various types of on-off valves can be adopted as a gas changeover valve provided for the adherence preventing device of the adherence preventing means, depending on the embodiment of piping by which the gas supply port and the gas tank are connected, and the gas tank and the gas charge port are connected, respectively. On-off valve is not limited to the three-direction changeover valve as shown in the figure and a simple on-off valve can be provided.

The present invention is not limited to such an embodiment that the vacuum pump 10 is operated, gas stored in the gas tank 31 is charged in the drying hopper 2 while keeping the drying hopper 2 in depressurized state. For example, when gas stored in the gas tank 31 is charged to the drying hopper 2, the vacuum pump 10 can be controlled to be stopped. Accordingly, gas stored in the gas tank 31 can be further rapidly and effectively charged in the drying hopper 2. In such a case, gas stored in the gas tank is instantaneously charged in the drying hopper, so that the vacuum pump can be operated after a relatively short predetermined time.

In addition, when gas stored in the gas tank 31 is charged in the drying hopper 2, the vacuum pump 10 can be operated, without being stopped, and the vacuum state can be destroyed and the pressure can become above the atmospheric pressure just after gas is charged.

The carrier gas introduction valve 34 and the introduction port 35 can not be provided if the adherence preventing means for a plastic molding material introduces gas in the drying hopper 2.

INDUSTRIAL APPLICABILITY

For example, the apparatus of the present invention can be used as an apparatus for drying a plastic molding material and supplying the dried material for a next procedure as preparation in advance of molding process.

REFERENCE SIGNS LIST 1 drying apparatus under reduced pressure
2 drying hopper
4 heating means
7 thermal conduction fin
10 vacuum pump
11 vacuum piping
24 material charge valve
25 material discharge valve
30 gas charge port
31 gas tank
32 gas changeover valve
36 gas pressure regulation valve

The invention claimed is:

1. A drying apparatus under reduced pressure for a plastic molding material, comprising:
   a drying hopper provided with an airtight material charge valve capable of containing gas therein at its upper portion and a material discharge valve at its lower portion, and connected to a vacuum pump via vacuum piping;
   a heating means of thermal conduction type provided in said drying hopper; and
   a plastic material adherence preventing means in which a gas charge port connected to a gas tank storing gas via a gas changeover valve is provided between said material discharge valve and said drying hopper and stored gas is charged into said drying hopper by opening said gas changeover valve after predetermined time, thereby preventing adherence of a plastic molding material.

2. The drying apparatus under reduced pressure for a plastic molding material as set forth in claim 1, wherein:
   a gas changeover valve with three connection ports is provided for said gas tank as said gas changeover valve, in which a first connection port is always connected to said gas tank, a second connection port is connected to a gas pressure regulation valve connected to a gas supply port via an on-off valve, and a third connection port is connected to said gas charge port via an on-off valve; and wherein
   at its normal operation said on-off valve of said gas supply port is opened and said on-off valve of said gas charge port is closed, while after predetermined time of said normal operation, stored gas is charged into said drying hopper by closing said on-off valve of said gas pressure regulation valve and opening said on-off valve of said gas charge port while keeping said drying hopper depressurized.

3. The drying apparatus under reduced pressure for plastic molding material as set forth in claim 1, wherein said vacuum pump is controlled to be stopped when gas stored in said gas tank is charged into said drying hopper.

* * * * *